Dec. 6, 1960     I. D. KERRIDGE     2,962,819
DEVICE FOR TEACHING TYPING
Filed April 29, 1958     3 Sheets-Sheet 1
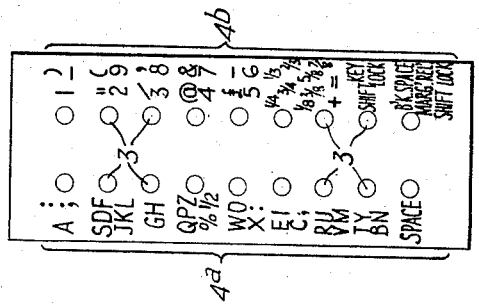
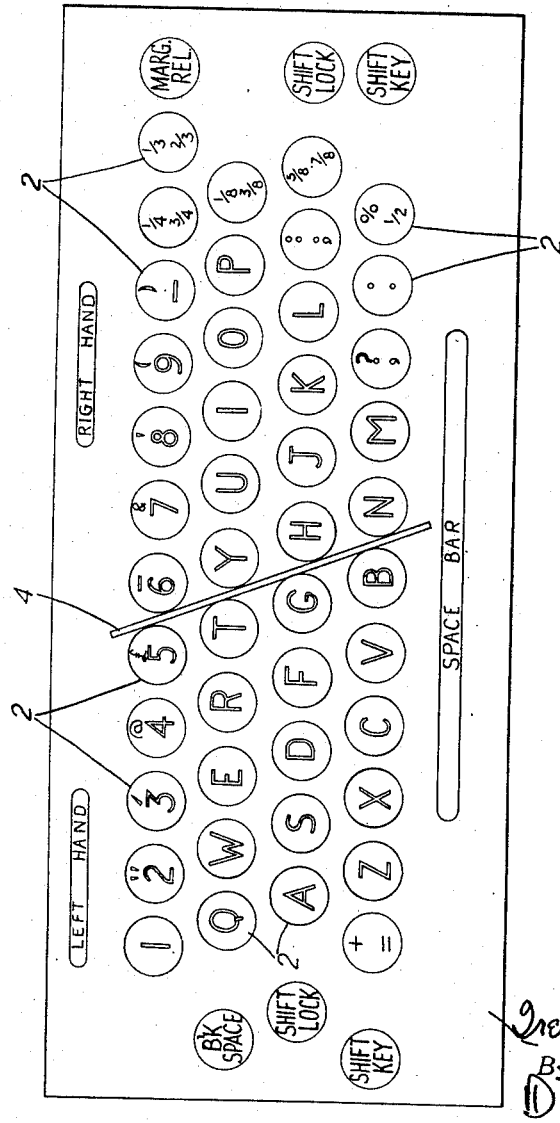
Inventor
Irene D. Kerridge
By
Dowell & Dowell
Attorneys Dec. 6, 1960     I. D. KERRIDGE     2,962,819
DEVICE FOR TEACHING TYPING Filed April 29, 1958     3 Sheets-Sheet 2

Inventor
Irene D. Kerridge
By Dowell & Dowell
Attorneys

Dec. 6, 1960   I. D. KERRIDGE   2,962,819
DEVICE FOR TEACHING TYPING
Filed April 29, 1958   3 Sheets-Sheet 3

Inventor
Irene D. Kerridge
By Dowell M Dowell
Attorneys

United States Patent Office 2,962,819
Patented Dec. 6, 1960

2,962,819
DEVICE FOR TEACHING TYPING

Irene Dorothy Kerridge, 5 Lennox Road, Gravesend, England

Filed Apr. 29, 1958, Ser. No. 731,720

Claims priority, application Great Britain Apr. 29, 1957

4 Claims. (Cl. 35—6)

This invention relates to a device for teaching typing by means of a visual representation of a typewriter keyboard.

The main object of the invention is to provide a representation of a keyboard having devices indicating the positions of the keys which can be illuminated or brought into view sequentially in order to assist the teacher to build up a practical knowledge of the keyboard rapidly in the minds of the class.

Another object of the invention is to provide a device in which the positions of the keys in a representation of a typewriter keyboard are indicated by electric lamps.

A further object of the invention is to provide a device in which representations of the keys of a typewriter keyboard are individually illuminated by the electric lamps under the control of switches connected to pre-arranged groups of the lamps or the individual lamps whereby the key-representations may be switched on in groups or individually.

Figure 3:
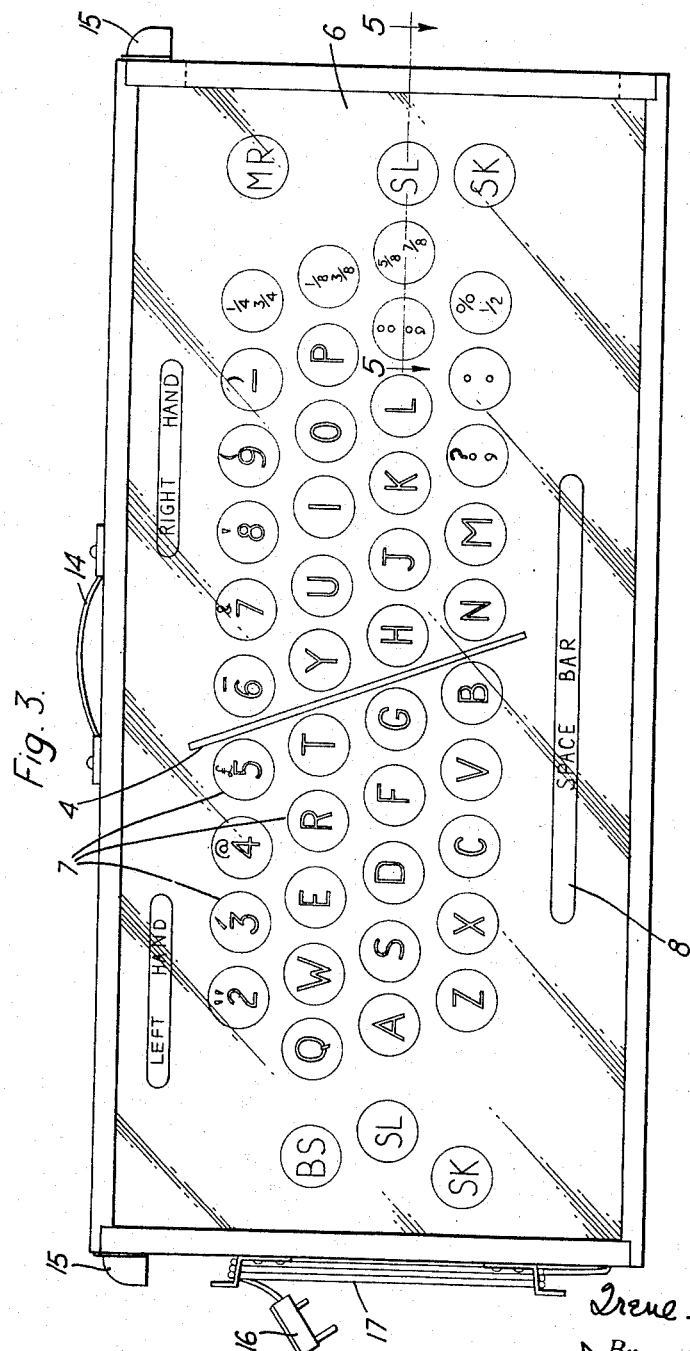
Figure 4:
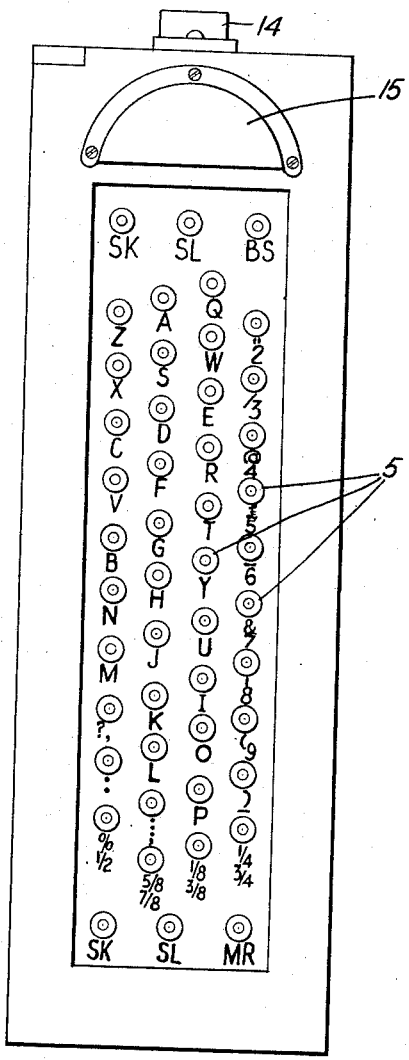
Figure 5:
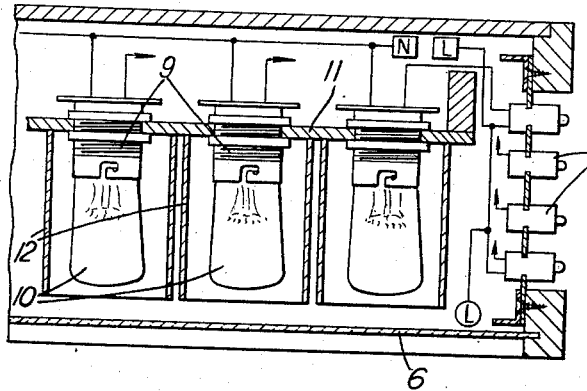

Other objects of the invention will be apparent from the following more detailed description with reference to the accompanying drawings in which:

Figure 1 is a front elevation showing an arrangement of a set of devices indicating the positions of the keys of a typewriter, Figure 2 is a diagrammatic side elevation showing the positions of switches for controlling the illumination of the key-indicating devices, Figure 3 is a front elevation of a modified form of the invention, Figure 4 is an end elevation of the device shown in Figure 3, and Figure 5 is a fragmentary sectional plan of the same drawn to a larger scale.

The device illustrated in Figures 1 and 2 takes the form of a rectangular casing having a front panel 1 on which representations of the various keys 2 of a typewriter are arranged so as to represent a complete keyboard. These representations are constructed so that they can be individually illuminated or displayed in any order required. For instance, they may consist of an array of electric lamps each representing an individual key and each marked with the letter or letters controlled by the key that it represents.

The representations are controlled by switches mounted on an end wall of the casing as shown in Figure 2 and arranged so that the teacher can switch on individual keys 2 and groups of such keys as required to show the positions of the keys on the keyboard and to control class exercises.

The preferred arrangement of switches and their connections is indicated in Figure 2 in which the circles 3 represent switches and the legends 4 indicate the keys whose representations they control.

A bar 4 separating the right hand part of the keyboard from the left hand part is preferably attached to the front panel as shown in Figure 1 so that it can be removed if required.

The device may be combined with a stand or easel by which it can be stood in front of a class with its front panel in the upright position.

The construction shown in Figures 3 to 5 of the drawings is generally similar to that shown in Figures 1 and 2 but is provided with individual switches 5 which enable each of the key representations to be illuminated independently of the others.

The device shown in Figures 3 to 5 has a rectangular casing closed at the front by a translucent screen 6 made of glass or other suitable material and having the representations of the keys of a typewriter painted or otherwise marked on it in circular boxes 7 as shown in Figure 3. A bar 4 separating the right-hand part of the keyboard from the left-hand part is painted or otherwise marked on the screen 6. The space bar of the typewriter is represented by an elongated box 8 painted or otherwise marked on the screen below the boxes 7, the legends "Left Hand" and "Right Hand" are also marked on the screen as shown.

To enable the boxes 7 to be illuminated individually, an array of lampholders 9 carrying lamps 10 are mounted on a panel 11 supported within the casing parallel to and behind the screen 6. The lampholders 9 are equal in number to the boxes 7 and are arranged so that each lamp is supported immediately behind one of the boxes 7 so that it will illuminate that box. To confine the light of each lamp substantially to one of the boxes, each lamp is surrounded by a hollow cylindrical shade 12 attached to the panel 11 and projecting forward almost to the screen 6 as shown in Figure 5. It is convenient to leave an appreciable gap between the front ends of the shades 12 and the translucent screen 6, the shades being blackened or made of black material to confine the light from each lamp substantially to the box for which it is intended and to prevent undesired illumination of adjacent boxes by diffused or reflected light. Each lampholder has one terminal connected to a common neutral and another terminal connected through one of the switches 5 to a common line, the electrical connections being accommodated between the panel 11 and the rear wall of the casing, as shown in Figure 5. The switches 5 are of any known type capable of being made small enough to accommodate the number of switches needed on the end wall of a portable box of convenient dimensions. They may be "push-pull" switches, that is of the type operated by knobs which can be pushed or pulled to move them to either of two positions, one of which is the "off" position whereas the other causes the corresponding lamp to be switched on. Alternatively, they may be of a "pressbutton" type constructed so they can be turned on and off by successive operations of the same press button.

Control of the device is facilitated by arranging the switches 5 in vertical columns corresponding to the key banks represented by the boxes 7. Thus, starting from the right, in Figure 4 the first column of switches from "/2 to ¼/¾ corresponds to the first bank of keys shown in Figure 3. The second column of switches from Q to ⅛/⅜ corresponds to the second bank, the third column from A to ⅝/⅞ corresponds to the third bank and the fourth column from Z to %/½ corresponds to the fourth bank. Back space, shift lock and shift key switches are provided at the top of the switch panel to control the illumination of the corresponding boxes at the left-hand side of the screen 6, and margin release, shift lock and shift key switches are provided at the lower end of the switch panel to control the illumination of the corresponding boxes at the right-hand side of the screen 6.

The parts marked 14 and 15 in Figure 3 are handles for carrying the device and the part marked 16 is an outlet-plug connected to a flexible cable 17 for supplying the current to the lamps 10.

To prevent overheating, the casing of the device is ventilated by making suitable airholes (not shown) in the upper and lower walls of the casing.

I claim:

1. Apparatus for teaching typing, comprising a box having an end wall and a translucent front wall; a representation of a keyboard having devices indicating the positions of the keys thereof marked on said translucent front wall; a plurality of lamp-holders mounted in said box and arranged so that each lamp is located immediately behind one of said devices indicating the position of the keys of said keyboard; switch means on said box for selectively controlling said lamps; and a plurality of shades surrounding said lamp-holders and projecting towards said front wall so as to direct the light from each lamp upon the particular device behind which the lamp is located, there being a gap between the front ends of the shades and the front wall, and the shades being made black to confine the light from each lamp substantially to the device behind which the lamp is located.

2. Apparatus for teaching typing, comprising a box having an end wall and a translucent front wall; a representation of a keyboard having rows of devices indicating the position of the keys in the keybanks of the keyboard marked on said translucent front wall; a plurality of lamp-holders mounted in said box and arranged so that each lamp is located immediately behind one of said devices; a plurality of shades surrounding said lamp-holders and projecting towards said front wall so as to direct the light from each lamp upon the particular device behind which the lamp is located; and a plurality of switches for controlling said lamps arranged in columns on said end wall, there being a gap between the front ends of said shades and said front wall, and the shades being made black to confine the light from each lamp substantially to the device behind which the lamp is located.

3. Apparatus for teaching typing comprising a box having an end wall and a translucent front wall; a representation of a keyboard having devices indicating the positions of the keys thereof marked on said translucent front wall; a plurality of lamp-holders mounted in said box and arranged so that each lamp is located immediately behind one of said devices indicating the position of the keys of said keyboard; switch means on said box for selectively controlling said lamps; and a plurality of shades surrounding said lamp-holders and projecting towards said front wall so as to direct the light from each lamp upon the particular device behind which the lamp is located, there being a gap between the front ends of the shades and the front wall.

4. Apparatus for teaching typing, comprising a box having an end wall and a translucent front wall; a representation of a keyboard having rows of devices indicating the position of the keys in the keybanks of the keyboard marked on said translucent front wall; a plurality of lamp-holders mounted in said box and arranged so that each lamp is located immediately behind one of said devices; a plurality of shades surrounding said lamp-holders and projecting towards said front wall so as to direct the light from each lamp upon the particular device behind which the lamp is located; and a plurality of switches for controlling said lamps arranged in columns on said end wall, there being a gap between the front ends of said shades and said front wall.

References Cited in the file of this patent

UNITED STATES PATENTS

| | | |
|---|---|---|
| 2,154,478 | Smith | Apr. 18, 1939 |
| 2,500,507 | Avery et al. | Mar. 14, 1950 |